United States Patent [19]

Colson et al.

[11] 4,223,278
[45] Sep. 16, 1980

[54] HIGH ENERGY, RAPID DISCHARGE DEVICE FOR THE EXCITATION OF GAS DISCHARGE LASERS

[76] Inventors: Steven D. Colson, 1025 Notch Rd., Cheshire, Conn. 06410; Paul C. Engelking, 1760 Athens NW 1, Boulder, Colo. 80302; Robert E. Turner, 169 Norton St., New Haven, Conn. 06511

[21] Appl. No.: 764,479

[22] Filed: Jan. 31, 1977

[51] Int. Cl.² .............................................. H01S 3/09
[52] U.S. Cl. ........................................... 331/94.5 PE
[58] Field of Search .................. 331/94.5 G, 94.5 PE, 331/94.5 D

[56] References Cited

U.S. PATENT DOCUMENTS 4,112,391  9/1978  Godard ...................... 331/94.5 PE

OTHER PUBLICATIONS

T. Y. Chang et al., "A Simple Self-Mode-Locked Atmospheric Pressure $CO_2$ Laser", *IEEE J. of Quantum Electronics*, Aug. 1972, pp. 721-723.

Primary Examiner—James W. Davie
Attorney, Agent, or Firm—E. Seward Stevens

[57] ABSTRACT

A new method and apparatus for storing and delivering the electrical energy used to drive high powered, gas discharge laser devices which require transverse electrical excitation utilizes high voltage commercial storage capacitors and the optimum electrical characteristics and cost advantages of planar electrical transmission lines.

9 Claims, 14 Drawing Figures

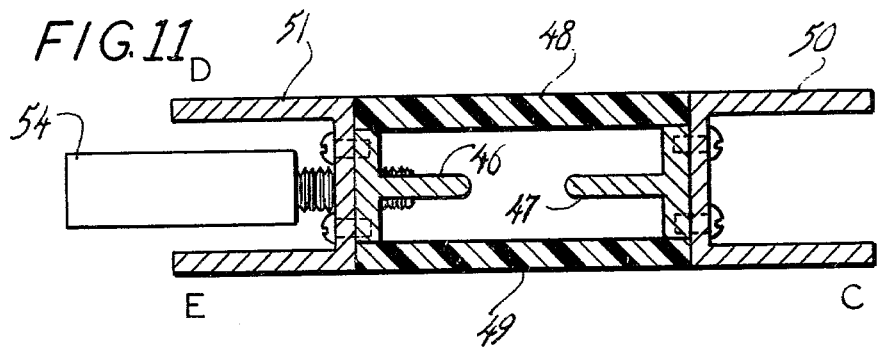

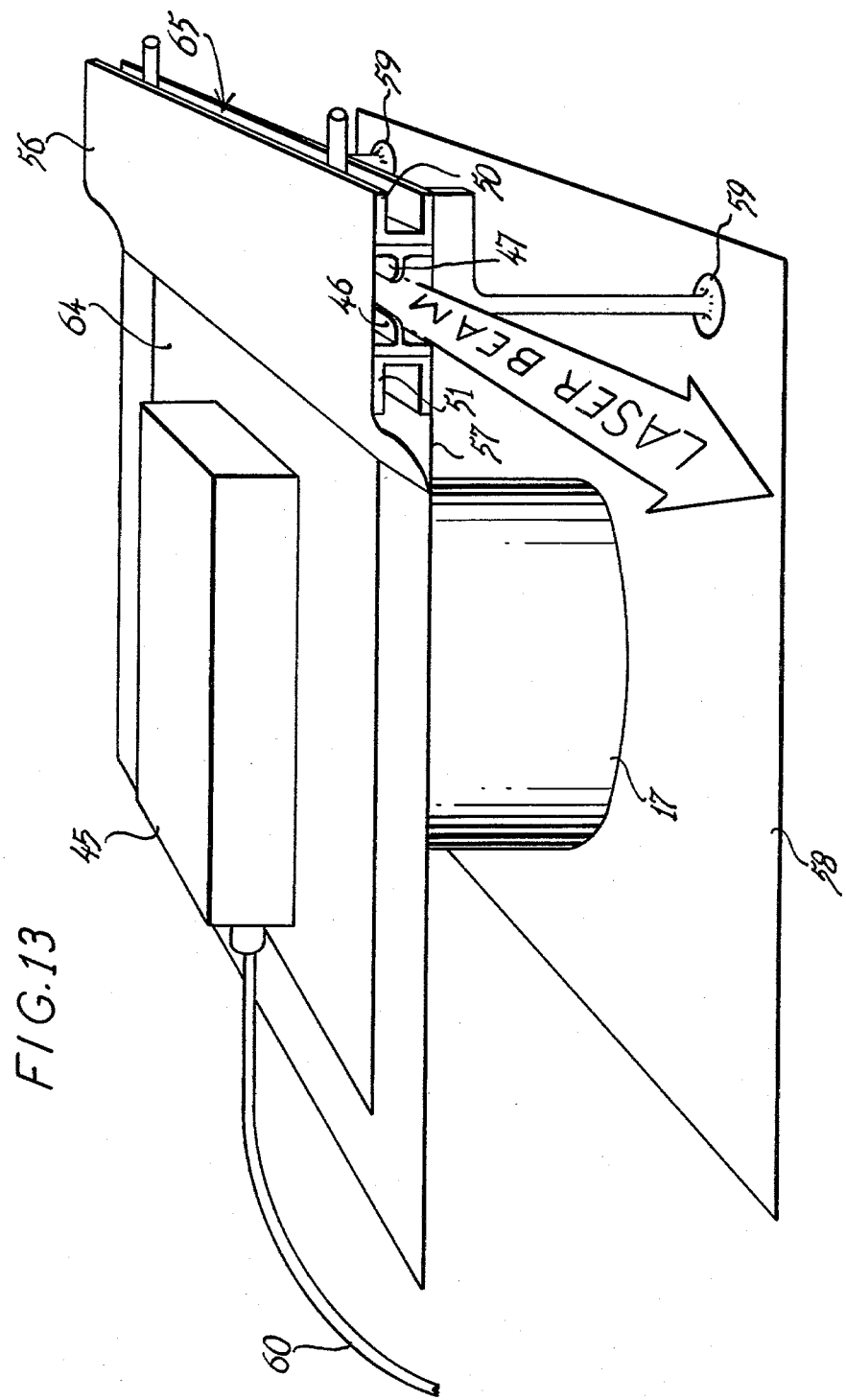

HIGH ENERGY, RAPID DISCHARGE DEVICE FOR THE EXCITATION OF GAS DISCHARGE LASERS

THE METHOD

Gas discharge laser devices consist of a laser tube (a tube with windows on either end which contain an appropriate gas or gas mixture) and an electronic excitation source. The excitation source drives electrical energy through the gas in the laser tube either continuously or for short periods of time, resulting in continuous or pulsed laser light outputs respectively. This is accomplished either by inserting electrodes into both ends of an insulating tube for longitudinal excitation of the gas or by using electrodes which form two sides of the laser tube and driving the electrical current across the tube for transverse excitation of the gas. Some gas lasers (i.e. carbon dioxide, nitrogen and xenon fluoride lasers) require extremely fast electrical driving pulses to be delivered to the entire gas sample simultaneously. This is best achieved via transverse excitation and requires specialized electronic driving devices. Our design efforts have resulted in a novel transverse discharge design that is simple, economical, and reliable.

To illustrate the novel features of our method of and structure for electronically driving the laser tube, it will be contrasted to the two most similar methods. The method will be described in detail as will a typical structure for implementation of the method with reference to the accompanying drawings, in which:

FIG. 11 shows a cross section of the laser channel.

FIG. 12 shows a top view of the laser channel.

FIG. 13 is a perspective view of the completed laser assembly.

When utilizing the lumped capacitance method, (see U.S. Pat. Nos. 3,553,603 and 3,729,689) the energy is first stored in a high voltage capacitor which is charged by the primary power supply. This energy is then rapidly switched into many coaxial cables which deliver it to numerous points along the length of the high voltage electrode of the laser channel at currents much greater than can be delivered by the primary supply. Thus, the storage capacitor and switch provide for the high current energy source and the cables distribute the charge along the laser tube. The disadvantages of this method are the expense of the cables, the complexity of the construction and the frequent failure of the cables. In order to obtain high energies, these devices are frequently operated at 15 to 25 KV, which results in periodic high voltage breakdown of the cables.

Figure 1:
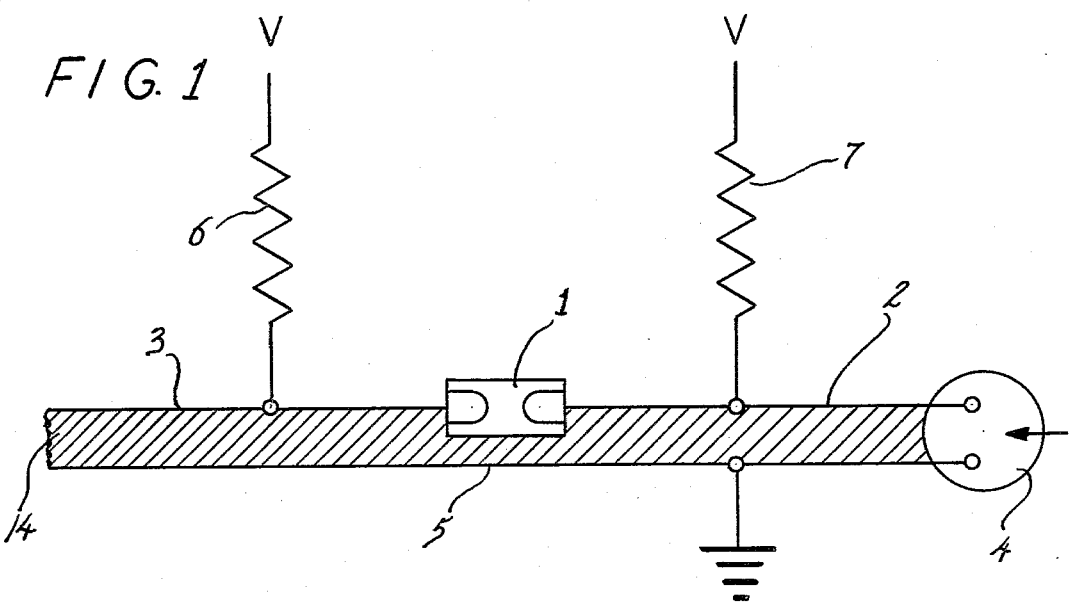
FIG. 1 is a schematic of the Blumlein design.

The Blumlein and other related designs (as described in U.S. Pat. Nos. 3,571,746; 3,729,689; 3,821,664; 3,879,681; 3,757,248; 3,882,488) utilize large planar capacitors for both energy storage and for delivering the energy along the length of the laser tube 1. A typical Blumlein device is shown in our FIG. 1 for comparison. Two larger planar capacitors (consisting of metal sheets 2, 3 and 5 separated by a dielectric spacer 14) are both charged through resistors 6 and 7 to about 15 KV by the primary power supply attached at points V. Subsequently one point of one capacitor is shorted to ground by a high voltage switch 4 (usually a triggered spark gap). As the voltage on the first capacitor goes to zero, the resulting voltage drop across the laser tube 1 causes the second capacitor to discharge across the laser tube and subsequently to ground through the spark gap. Thus, in this design, the first capacitor and spark gap combine to form the high current switch and the second capacitor both stores and delivers the energy along the laser tube. The use of two matched capacitors provides for the most rapid discharge across the laser, resulting in laser output pulse widths roughly half that obtained with lumped capacitor designs. For some applications (i.e. the use of a nitrogen laser to drive a dye laser) this is a distinct disadvantage. Another disadvantage is that the planar capacitors themselves suffer high-voltage breakdown after a period of use and must be either repaired or replaced. Under normal operation we have found this to occur on a time scale of a few weeks. The importance of this difficulty is reflected by the replaceable insulating plate described in U.S. Pat. Nos. 3,729,689; 3,821,664 and 3,879,681 as well as by the fluid containing cavity described in U.S. Pat. No. 3,882,418.

Figure 2:
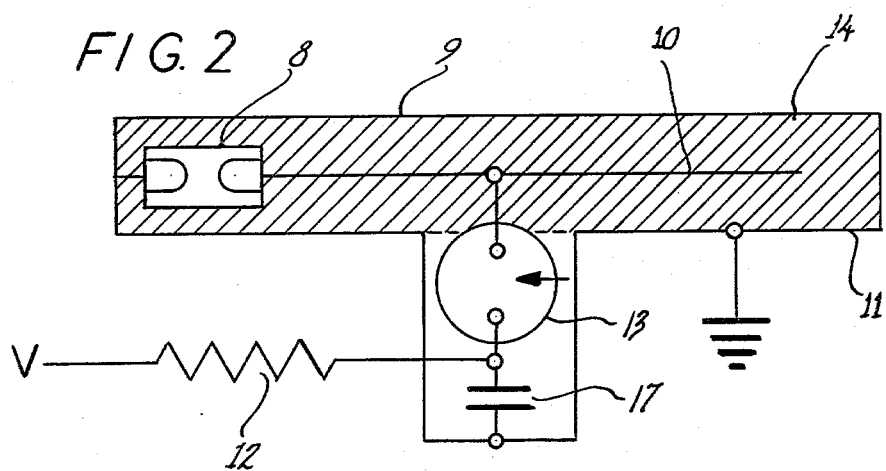
FIG. 2 is a schematic of a Laser constructed in accordance with our design.

We utilize a commercial high voltage capacitor 17 for reliable energy storage and a planar transmission line (a capacitor formed from metal sheet conductors 9 and 11, separated by a dielectric insulator 10) to deliver the energy to the laser tube. This method is contrasted with the Blumlein method in FIG. 2 where the high voltage is now applied at one point V through charging resistor 12. To fire the laser, the high voltage switch 13 is triggered and the energy stored in 17 is delivered to the laser tube 8 by conductor 11. Relieving the transmission line of the function of energy storage also relieves it of the nearly constant D.C. voltage stress accompanied by intermittent, severe, voltage reversals that occur upon firing the Blumlein type lasers. This significantly lengthens the life of the transmission line such that our first laser has been in experimental operation without once suffering a high-voltage breakdown of the transmission line. Thus, this novel combination of components (lumped storage capacitor and planar transmission line) results in a device which is different and clearly superior in its operating characteristics when compared to prior devices which have utilized some of these same components in a different manner.

Another aspect of our design is the use of two or more planar circuits in parallel, thereby reducing the total transmission line impedance and making for a more rapid electrical discharge. This, however, is not in itself novel, having been anticipated in the multiple parallel cable designs and in some Blumlein designs. It is, however, useful here for two reasons: (1) it lowers the transmission line impedance and (2) it allows all high-voltage line elements to be placed within a totally enclosed, grounded shield, thus protecting the operator from dangerous voltages and shielding the immediate environment from radio frequency radiation generated by high voltage switching.

In summary, the advantages of our method are (a) simplicity, (b) ease of construction, and (c) low cost (all in comparison to the multiple cable method); (d) longer laser pulse widths (when compared to the Blumlein method) and (e) reliability (when compared to either method). While we have demonstrated these advantages by application to the nitrogen laser, the method should result in similar advantages for other gas discharge lasers requiring rapid transverse excitation.

THE DEVICE

The proper utilization of this new discharge technique is contingent upon the correct selection and design of the following components (a) the storage capacitor, (b) the high voltage switch (hydrogen thyratron or spark gap), (c) the planar transmission line and (d) the laser tube. The design criteria for each component include not only the proper electrical characteristics but also economy, reliability and ease of construction. Each component will be discussed separately and then the completed device will be described below in a structure that is meant to be an illustrative but not a restrictive application of the method.

A. The Storage Capacitor.

Figure 9:
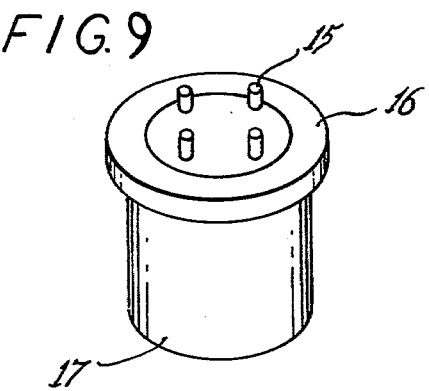
FIG. 9 shows the capacitor—top view.

A variety of high quality commercial devices are available for use. One was selected with a capacitance in the 0.1 to 0.3 micro farad range with a design life in excess of $10^8$ shots when operated at 15 KV with 80% voltage reversal. The inductance should be less than 15 nH. One with four high voltage studs (collectively designated as 15) and a coaxial grounding ring 16 on the same end of the capacitor 17, the outer capacitor wall forming a ground shield, (see FIG. 9) has been found to be useful in the design of a low inductance connection to the transmission line.

B. The High-Voltage Switch.

Figure 3:
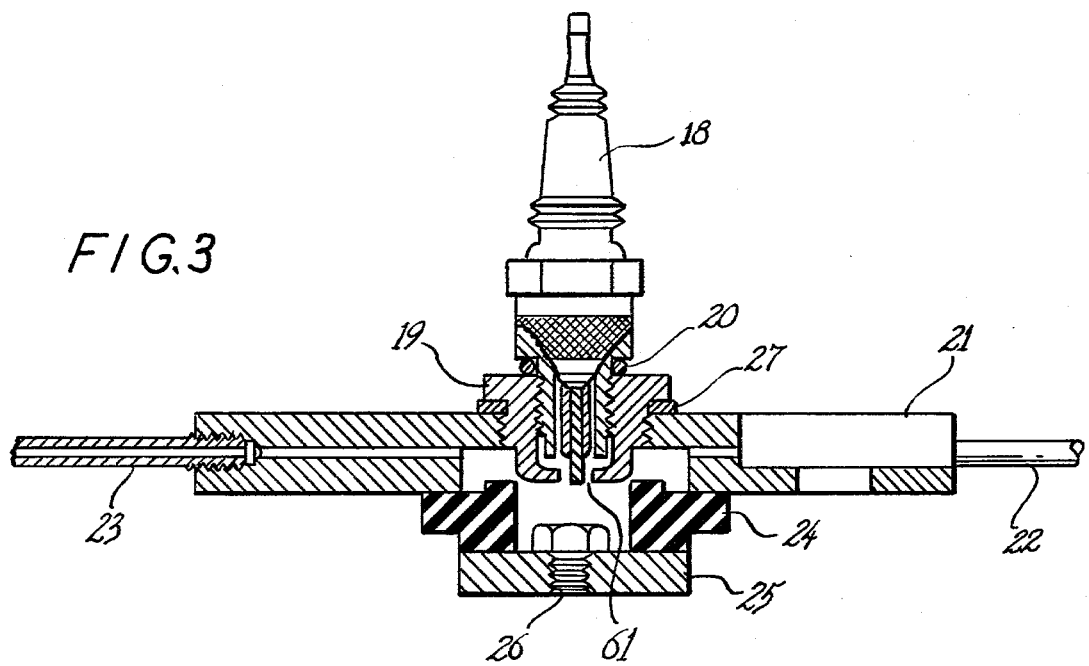
FIG. 3 shows a cross section of the spark gap.
Figure 4:
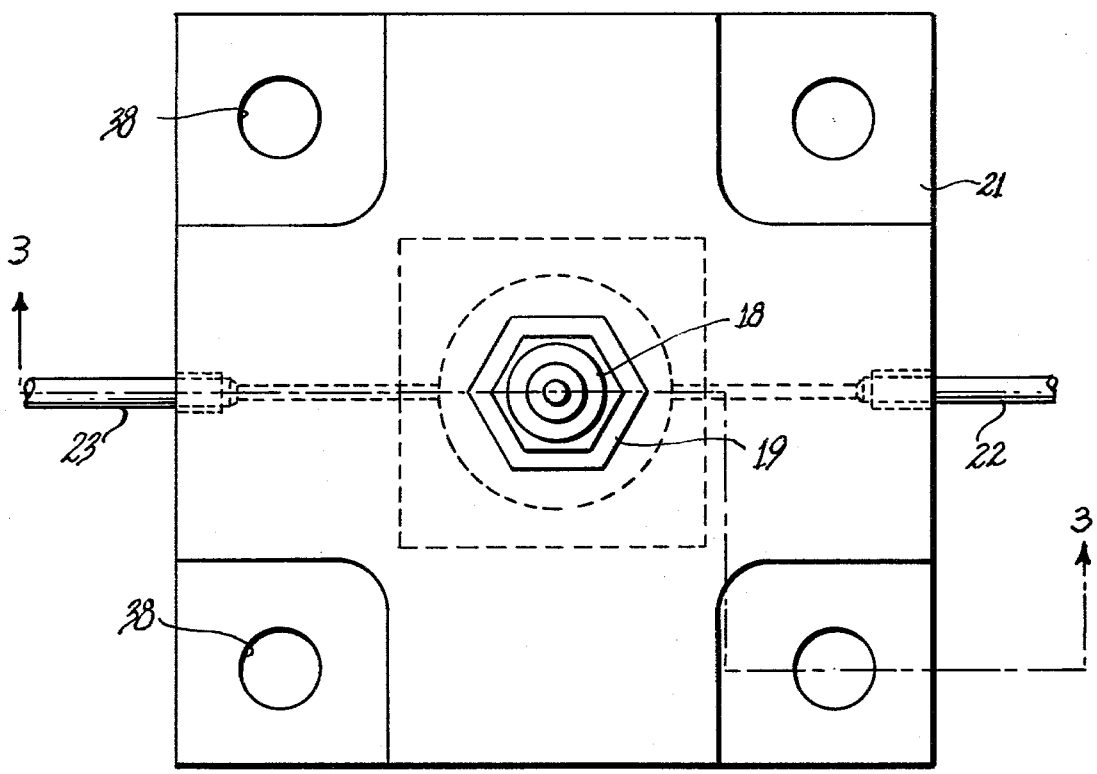
FIG. 4 shows a top view of the spark gap.

For simplicity of operation and minimum expense and to minimize the switch inductance, we chose to use a triggered spark gap switch. The testing of one of the best commercial spark gaps available demonstrated the need for developing our own design. The extremely high peak currents (i.e., in excess of 20,000 amps) switched by these devices require that they be rugged and inexpensively repaired. The maintenance costs of the commercial unit made it unsatisfactory for long-term use. Furthermore, the variety of applications anticipated for the laser require that the spark gap be operable in the 5 to 17 KV range and no known commercial device was operable over this entire range. Therefore, we designed a rugged device constructed from readily available, inexpensive components and one that could be adjusted to operate at any of the desired voltages (see FIGS. 3, 4). The spark gap consists of six components:

(a) A spark plug 18 modified by removing the ground, gapping electrode.

(b) The top electrode 19 of the spark gap which was constructed from a ¾ inch steel bolt with N.F. threads that had been drilled and tapped to accept the spark plug; the juncture of the two being sealed with a rubber gasket 20. The end of the bolt was turned down, the exterior tip rounded off and a 3/16 inch hole 61 drilled in the tip to allow the high voltage electrode of the spark plug to extend through until flush with the bottom of the bolt 19.

(c) An aluminum plate 21 threaded to accept the modified ¾ inch steel bolt 19 and containing four holes (collectively designated as 38) for attachment to the high voltage posts 15 of the capacitor 17 and two tubes 22, 23 for pressurizing the spark gap to stabilize its operation. By clamping down securely with the four high-voltage connectors 15, the device could be made leak tight to 30 psi.

(d) A high-voltage insulating spacer 24 which separated the aluminum plate 21 (which was normally held at high voltage) from the brass plate 25.

(e) A brass plate 25 for sealing off the bottom of the spark-gap and making contact with the inside conducting plane 30 of the transmission line at point A.

(f) A steel bolt 26 with a rounded head to form the bottom electrode of the spark gap.

Most of the wear is experienced by the spark plug and the two modified steel bolts 19 and 26 which are found to have a lifetime comparable to the more sophisticated components of the commercial devices and are considerably less expensive to replace. Furthermore, this device could be operated stably over a greater than 5 KV range by adjustment of the pressurization of the spark gap. The mean of this range could be set between 5 and 15 KV by varying the spacing between the two electrodes 19 and 26 by threading them further in or out of their mounting plates and adjusting the thickness of the lead gasket 27.

C. The Planar Transmission Line.

Figure 5:
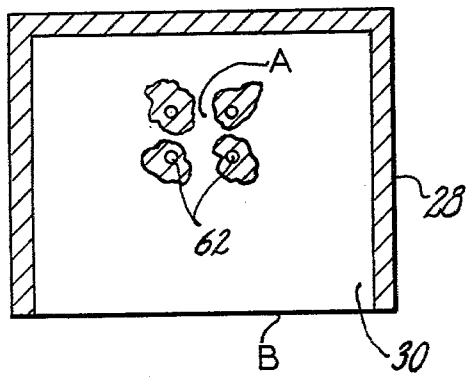
FIG. 5 shows the top surface of the bottom printed circuit board.
Figure 8:
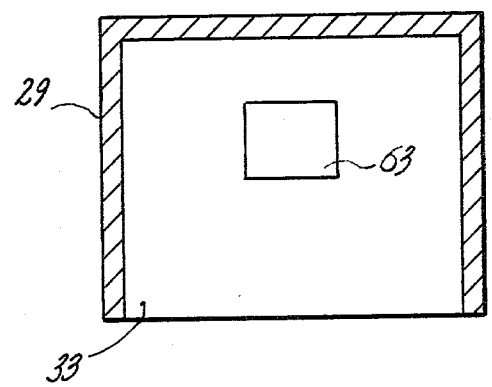
FIG. 8 shows the bottom surface of the bottom printed circuit board.
Figure 6:
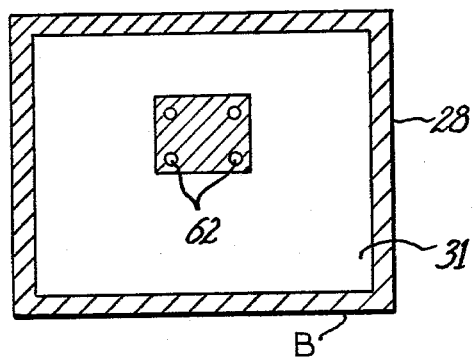
FIG. 6 shows the bottom surface of the bottom printed circuit board.
Figure 7:
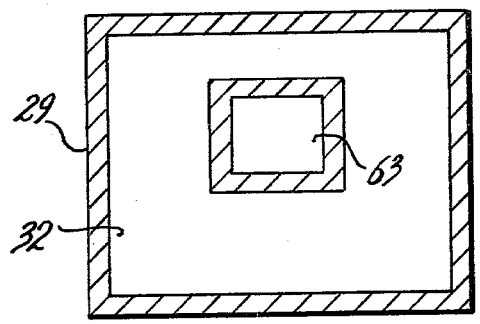
FIG. 7 shows the top surface of the top printed circuit board.

We initially used flexible materials for the construction of the transmission line. This has the advantage that the line can be rolled or folded to minimize the bulk of the laser. However, because of its low cost and ready availability, we selected rigid printed-circuit board material formed from 0.030 inch thick epoxy-glass dielectric sheets with 0.001 inch thick copper conductors bonded to each side for the construction of our working model. The copper was etched back from the edges to prevent current leakage as shown in FIGS. 5–8. The transmission line 64 was formed by bonding two such sheets 28 and 29 together with surfaces 30 and 33 in contact at every point with edges B in common. They were attached together as by bolts (not shown) every two inches along the edge B which was to be next to the laser tube and the other three etched edges of the two boards bonded together with a thin layer of a high dielectric adhesive to prevent any current leakage at high voltages. These three edges are then covered with copper flashing which makes electrical contact between the top 32 and bottom 31 ground planes. The line was subsequently attached to edge C of the laser tube by a series of smaller bolts (not shown) every two inches along the length of edge B. In this configuration, the copper surfaces 30 and 33 become equivalent in function to part 11 of FIG. 2 (the high voltage conductor) and the copper surfaces 31 and 32 serve the function of part 9 (the ground plane). To attach the line to the high voltage capacitor 17, four holes (collectively shown as 62) were placed in the bottom board to match the high voltage studs of the capacitor and the copper plating was etched away from the area around these holes on the top and bottom of the board 28 as shown in FIGS. 5 and 6. Electrical access to this area was made by cutting an 8 inch square hole 63 in the top board 29 and etching the top copper surface back from the edges of the hole as shown in FIG. 7. Note that a copper "cross" etching pattern was left on the top surface of the bottom board 28 around point A. The center of this cross will be the point A at which plate 25 of the spark gap will make electrical contact with the high voltage conductor of the transmission line. This shows one of the advantages to the selection of four contact posts 15 on the capacitor 17. It provides for the optimum number of contacts which will also allow for an etching pattern of copper with adequate current capabilities. It is important to note that our method relies upon the use of the transmission line 64 as an intermediate, low inductance energy storage capacitor. For instance, a line with an area of 12 sq. ft. gives sufficient capacitance for producing nitrogen laser outputs in the 5 to 10 mj-per-pulse range.

Figure 10:
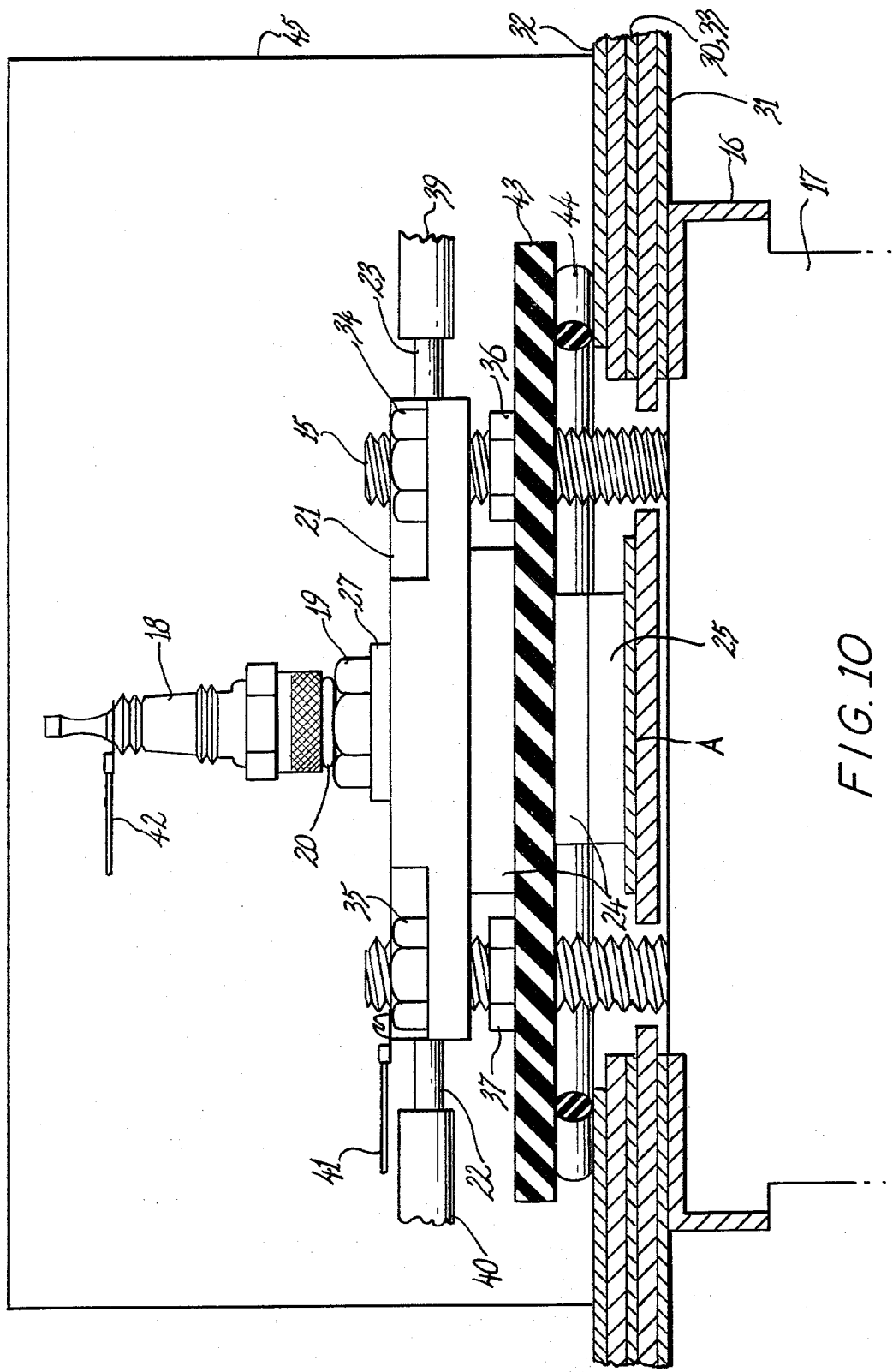
FIG. 10 shows a cross section of the completed spark gap/transmission line/ storage capacitor assembly.

A partial cut-away of the capacitor/spark gap/transmission line assembly is shown in FIG. 10. An aluminum chassis 45 was placed around the spark gap to shield the operator and eliminate RF noise. An eleven inch square hole was cut in the bottom of the chassis and, after placing it over the high voltage studs and on top of the transmission line, this subassembly was clamped together using a rigid insulator 43 which was held firmly in place by nuts 36 and 37 and two others (not shown) on the other high voltage studs of the capacitor 17. The tension in this clamping device was maintained by the rubber gasket 44. The assembled spark gap was then attached by inserting part 25 and a portion of part 24 through a matching hole in the center of the rigid insulator 43. The clamping nuts [34 and 35 and two others (not shown) on the other two studs] seal the surfaces of the spark gap tightly together and provide for good electrical contact with the planar transmission line at point A. The pressurizing gas for stabilizing the operation of the spark gap enters and exits through rubber tubes 39 and 40 respectively. The electrical leads (41 and 42 respectively) from the power supply and the trigger generator are also shown in FIG. 10.

D. The Laser Tube.

The laser tube 65 (see FIGS. 11, 12 and 13) is formed from two, long electrodes 46, 47 separated by insulators 48, 49. The electrodes are each formed from standard aluminum extrusions, two with "tee" cross-sections 46 and 47 and two with channel cross-sections 50 and 51 which are bolted together as shown in FIGS. 11 and 12. A single extrusion with the same resultant cross-section would eliminate the need for these bolts. The stem of the tee forms the electrode and its base, in combination with the channel, forms a ledge for holding the insulator. The channel also provides flange surfaces C, D and E for attaching the transmission line. The edges of the electrode are formed to the shapes shown in FIGS. 11 and 12 edges of the high voltage electrode (47,50) are connected to edge B of the transmission line along its edge C as described in the previous section. The other (ground) electrode (46,51) is connected to the top and bottom ground planes of the transmission line via 6-inch wide strips 56 and 57 of 0.005 inch thick copper flashing which are placed along the top and bottom lengths of the laser tube 65. One side of each strip is bolted to the ground electrode flanges D and E and the other is connected by a solder weld to surfaces 31 and 32 along the full length of the transmission line. Sheets of high dielectric insulator (not shown) are placed between the copper flashing and the high voltage connections to prevent direct arcing to ground.

The insulators 48 and 49 are attached to the electrodes with a high dielectric adhesive as are quartz windows 52 and 53 which form the two ends of the laser tube 65. Hose connections 54 and 55 are placed in each end of the ground electrode to allow the laser fill gas to be pumped through the tube at an appropriate pressure for efficient laser activity.

The use of electrodes structured such that they provide substantial support for the insulating spacers 48, 49 maximizes the design flexibility in the choice of insulating materials. Some laser gas-fills (e.g. those used in xenon-fluoride lasers) are highly corrosive and require the use of specialized materials to form or coat the insulating spacers. Such materials are often expensive to produce in other than rectangular forms. Furthermore, some plastic materials often used as insulators crack and deteriorate in time if used in a manner that produces areas of localized strain. Our approach, where the hose connections 54, 55 are supported by the metal electrode and where the insulating spacers are bonded to the electrodes, minimizes any localized strains in the spacers. An alternative approach with the same desirable result would be achieved by placing a gasket between the insulating spacers and the support ledge on each electrode. The entire device could then be held together with a clamp designed to press the spacers onto their support ledges, forming a tight seal.

E. The Completed Laser Assembly.

The components described above are assembled to give a device as shown in FIG. 12. The assembled laser tube is supported by a structure 59 which is attached to the flange E and to the mounting platform 58 which also supports the capacitor 17. A portion of the cable 60 used for attachment to the high voltage source is also shown. The laser beam, which can exit from both ends of the laser tube, is colinear with the center line running the length of the laser tube 65. Increased laser output power is obtained by placing reflectors i.e. mirrors (not shown) at either end of the laser tube 65 and centered on said center line. The transmission characteristics of one reflector (a partial reflector selected to be the output mirror) are selected to give optimum laser power outputs depending upon the gain characteristics of the gas or gas-mixture in the laser tube. For a nitrogen gas fill, the output mirror can be omitted.

Figure 14:
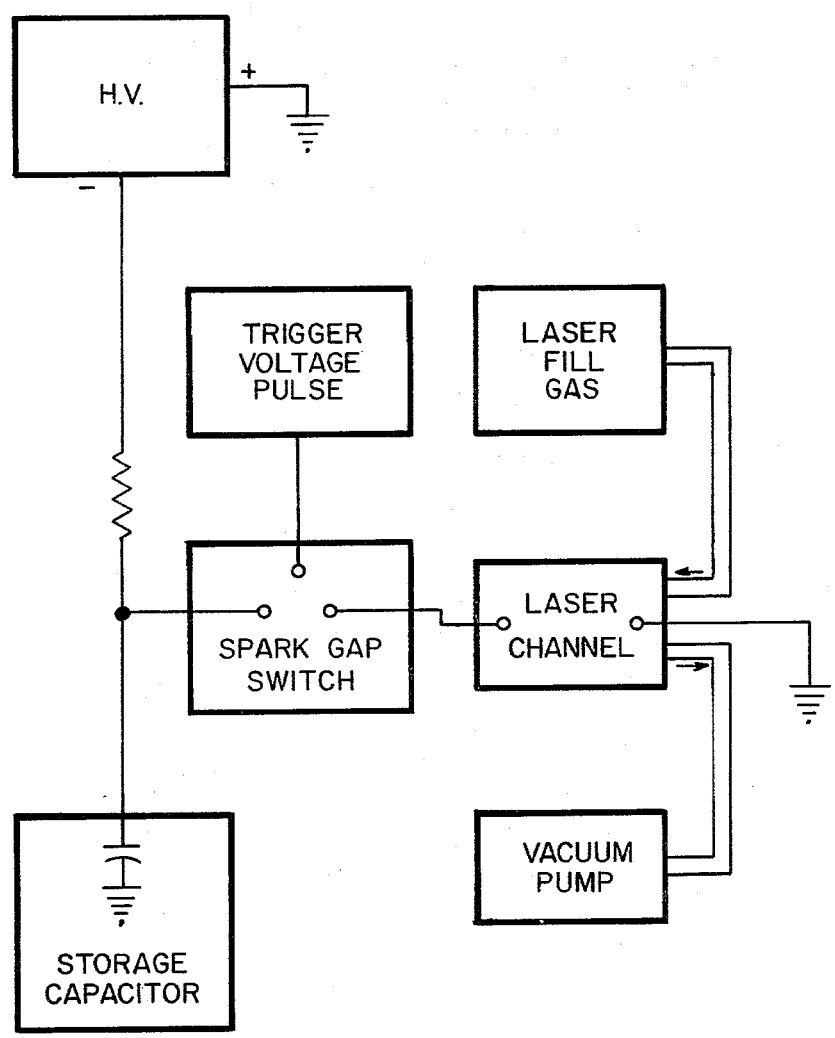
FIG. 14 is a schematic representation of all components necessary for operation of the laser.

A schematic illustration of all major components required for the operation of our transverse excitation discharge laser is shown in FIG. 14. Typical specifications and operating characteristics are given in Table I when the laser is used with a nitrogen fill-gas.

TABLE I

| | |
|---|---|
| Storage Capacitor | 0.1 to 0.3 micro farad |
| Operating Voltage | 7 to 17 KV |
| Repetition Rate | 0 to 50 pules-per-sec |
| Peak Laser Power Output | 0.3 to 1 $\times$ $10^6$ watt |
| Laser Pulse Width (Nominal) | $10^{-8}$ sec. full width at half-height |
| Laser Pulse Energy (Maximum) | $10^{-2}$ joules-per-pulse |

Although the invention has been shown and described with reference to particular embodiments, nevertheless various changes and modifications obvious to a person skilled in the art are deemed to lie within the spirit, scope and contemplation of the invention.

What we claim is:

1. A transverse excitation, pulsed discharge gas laser comprising,
    a gas discharge laser tube formed from two substantially parallel electrodes extending the full length of the tube, means for holding said electrodes in place comprising rigid insulating spacers forming the longer sides of said tube, rigid insulators of high optical transmittance forming the ends of said tube, a lumped, high voltage capacitor for intermediate storage of electrical energy, means for connecting said capacitor and laser tube comprising a single electrical transmission line, a high voltage switch for making controlled, intermittent electrical contact between the capacitor and the transmission line, a high voltage power supply for charging said intermediate storage capacitor and a gas pumping and supply system for maintaining the proper gas-fill in the laser tube.

2. A structure according to claim 1 wherein the electrodes are formed from at least one extrusion of a metal with high electrical conductivity such as aluminum or copper.

3. A laser as in claim 1 wherein the cross-sectional shape of the metal electrodes includes means for attachment of the transmission line to the electrodes and other means for attachment of said electrodes to said insulating spacers whereby localized strains in said spacers are minimized.

4. A structure of claim 1 wherein said insulating spacers are formed from a material or coated with a material which is essentially inert to reaction with the fill-gas in the laser tube.

5. A laser as in claim 1 wherein the lumped, high voltage capacitor is constructed to have low inductance and has means for a low inductance connection to said switch and transmission line.

6. The structure of claim 1 wherein said means for connecting the capacitor to the switch includes a grounding ring connector and a second connector comprised of a plurality of threaded studs, said connectors respectively providing ground and high voltage electrical contacts with said switch and transmission line, both connectors being located on one end of a capacitor of essentially cylindrical shape; the outer capacitor wall surface providing the electrical connection between the grounding ring and the low voltage (essentially ground) end of the capacitor.

7. A laser as in claim 1 including means for electrical connection of the lumped capacitor to essentially the entire length of the laser tube, said means comprising the single electrical transmission line.

8. A structure according to claim 1 wherein the transmission line is formed so as to have a capacitance nearly equal to that of the lumped storage capacitor.

9. A method for providing transverse electrical excitation to a gas discharge laser tube wherein the electrical energy is first stored in a lumped storage capacitor and then switched into a single, extended, capacitive transmission line which in turn distributes said electrical excitation energy along the essential transverse length of said laser tube.

* * * * *